Figure 1:
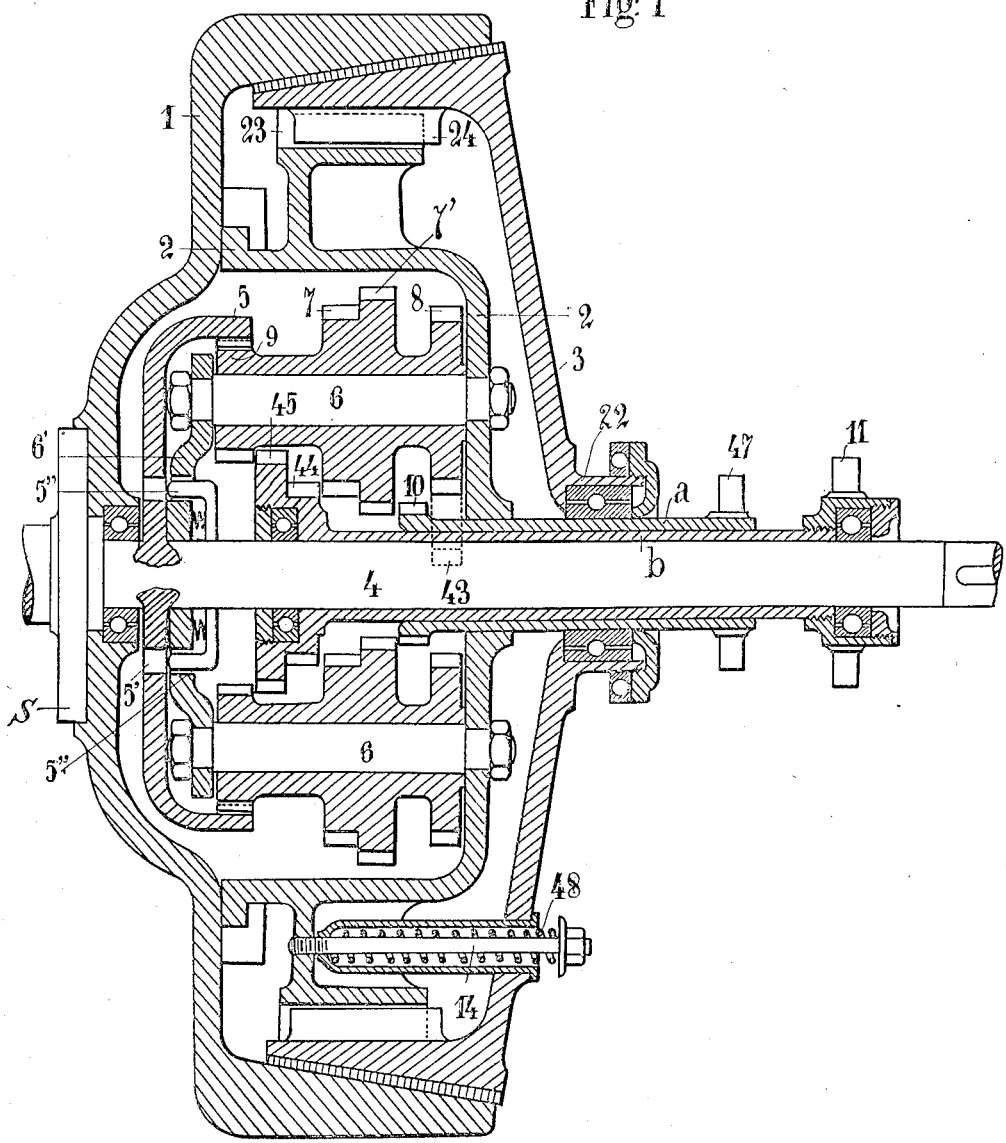

C. E. HENRIOD.
VARIABLE SPEED REVERSING MECHANISM.
APPLICATION FILED JAN. 16, 1908.

919,576.

Patented Apr. 27, 1909.
3 SHEETS—SHEET 1.

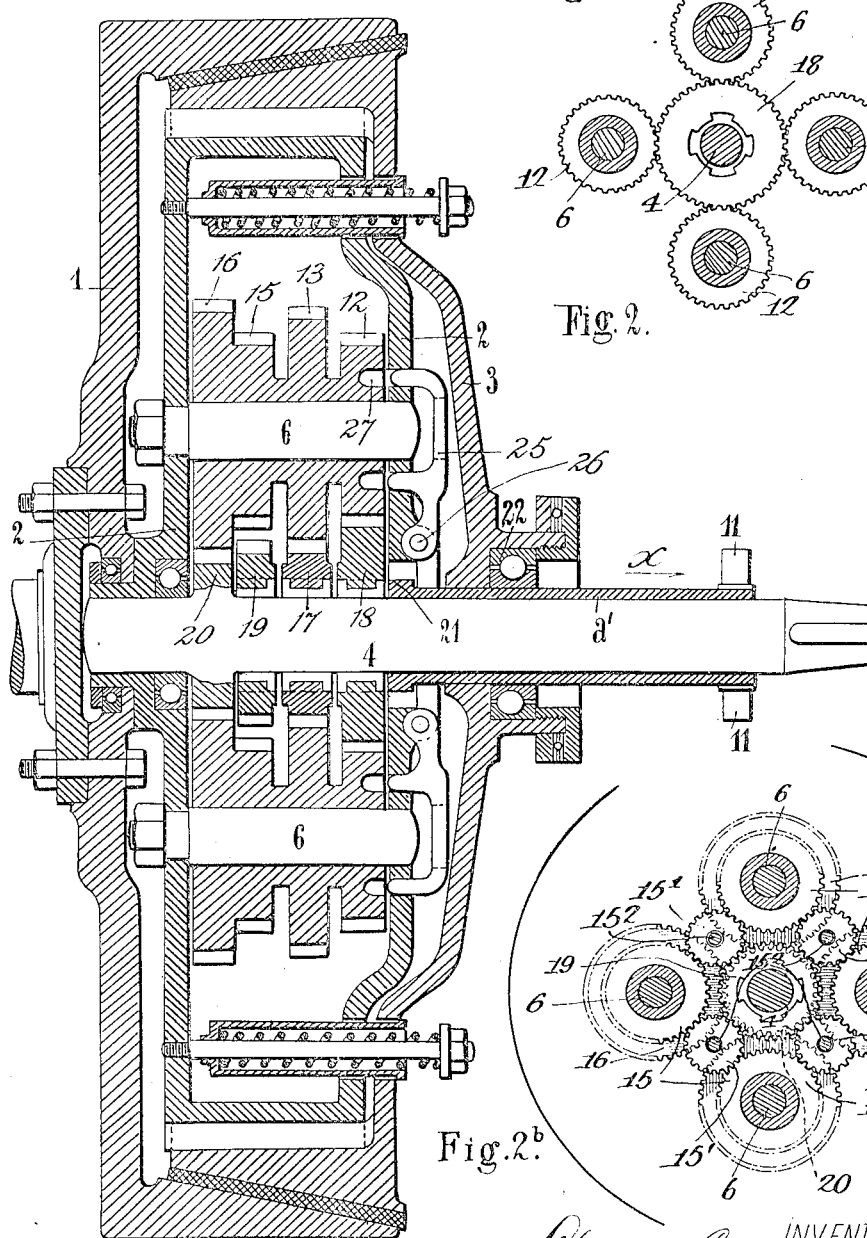

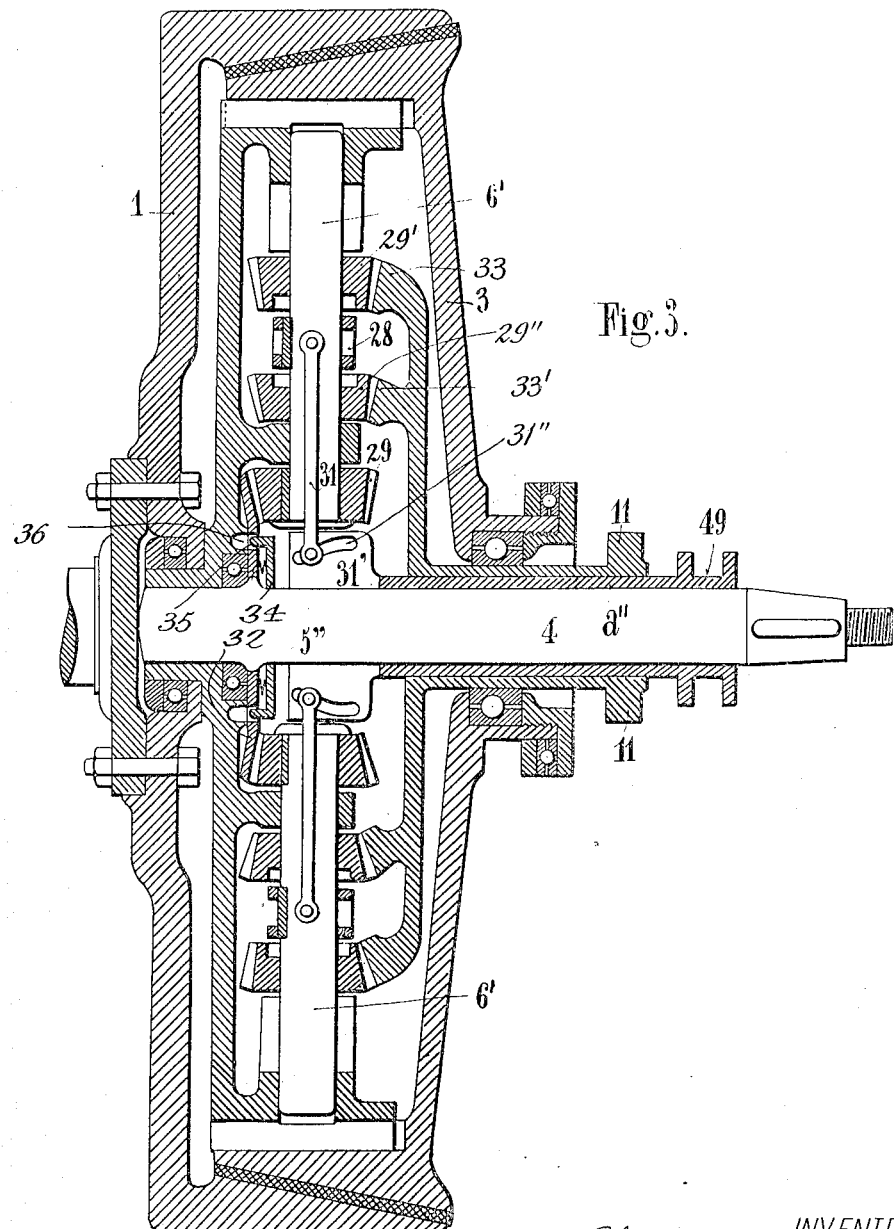

UNITED STATES PATENT OFFICE.

CHARLES EDOUARD HENRIOD, OF NEUILLY, FRANCE.

VARIABLE-SPEED REVERSING MECHANISM.

No. 919,576.  Specification of Letters Patent.  Patented April 27, 1909.

Application filed January 16, 1908. Serial No. 411,124.

*To all whom it may concern:*

Be it known that I, CHARLES EDOUARD HENRIOD, a citizen of the Swiss Confederation, and resident of Neuilly-sur-Seine, France, have invented new and useful Improvements in or Relating to Variable-Speed Reversing Mechanism, which improvement is fully set forth in the following specification.

The present invention relates to a transmitting mechanism and particularly to an improvement on the one described in my application Ser. No. 364,577, filed March 26th, 1907. In that application the mechanism which is designed to allow different changes of speed and reverse drive consists of a fly wheel system comprising a motor shaft, a fly wheel, planetary wheels and a driven shaft, and in which the change of speed is obtained by the direct braking of the planetary wheels.

The present invention has for its object to provide a fly wheel system which substantially comprises the same elements, but in which, instead of by direct braking of the planetary wheels, the change of speed is obtained by the action of idle wheels.

The mechanism can be used for various industrial purposes but it is chiefly intended to be used in the motor car industry.

In order to make my invention more clear the same is illustrated in the accompanying drawings, in which similar reference characters denote corresponding parts and in which—

Figure 1 is a longitudinal section of the apparatus, Figs. 2 and 3 are similar sections of modified constructions of the apparatus, and Figs. 2$^a$ and 2$^b$ are diagrammatic views showing the centering of the central gears in Fig. 2 by the satellite wheels and the intermediate gears, respectively.

With reference to Fig. 1, the fly wheel comprises a clutch, a gear for three changes of the speed and a reversing gear. Mounted on the motor spindle S is the first part 1 of the fly wheel. 2 is the second part thereof, which incloses the gear for changing the speed and which can be coupled with the part 1 by means of the clutch cone 3. 4 is the central spindle to be driven. This spindle may transmit its movement to a vehicle, a vessel or any other machine. Keyed to or rigid with said central spindle is a toothed crown 5 provided with notches 5', into which the extremities of a claw 5'' enter at the moment of direct engagement. The crown 5 in the present example has its teeth on the inside, but, evidently, the same could have the teeth just as well on the outside, in which case it would act upon the inside of the satellite wheels to be hereinafter described. Journaled in the part 2 of the fly wheel and in a disk 6' which is loosely mounted on the shaft 4 are spindles 6 which carry systems of idle satellite wheels. Each system may comprise any suitable number of such wheels. In practice three wheels will suffice. In the present example each system consists of the wheels 7, 7', 8 and 9 of different diameters. Of these wheels, 8 serves for the reverse movement, 9 for the third speed, 7 for the intermediate speed and 7' for the first speed. Mounted upon the central spindle 4 are nonrotary sleeves *a* and *b* which are capable of longitudinally sliding thereon. The sleeve *a* which can be displaced by acting on the pins 47 carries a toothed wheel 10, which, according to the position it occupies upon the spindle 4, engages either directly with the wheels 7' (for the forward movement), or, for the reverse movement, with the wheels 43, which mesh with the wheels 8 of the satellite systems. The sleeve *b* which can be displaced by acting upon the pins 11 carries two toothed wheels 44 and 45. According to the position occupied by the sleeve *b* upon the spindle 4, the wheel 45 will engage with the wheels 9 of the satellite systems or the wheel 44 with the wheels 7 thereof. Along the spindle 4 and on the outside of the sleeve *a*, a bearing 22 is slidably mounted, upon which rests the clutch cone 3 and by the displacement of which the parts 1 and 2 of the fly wheel can be either coupled with or uncoupled from one another. The part 3 carries inside keys or projections 24 slidably engaging grooves 23 formed on the outside of the part 2 of the fly wheel. The outer surface of the cone 3 acts by friction against the part 1 of the fly wheel. Secured to the part 2 of the fly wheel are guide rods 14 bearing springs 48 which constantly tend to bring part 3 into engagement with part 1.

The mode of operation is as follows: Supposing that the fly wheel is applied to a motor of an automobile vehicle, and that the motor is working while the vehicle is at rest. In this case the cone 3 is thrown out of engagement and none of the toothed wheels 10, 44 and 45 of the sleeves is in engagement with the toothed wheels of the satellite systems. Hence, the spindle 4 which, in this case, is the spindle driving the vehicle wheels, is at rest. When it is desired to start the vehicle the sleeve a is displaced until the toothed crown 10 thereof engages with the toothed wheel 7'. Thereupon the cone 3 is thrown into engagement, so as to couple the parts 1 and 2 of the fly wheel. By this manipulation the part 1 of the fly wheel, which revolves with the motor, sets the part 2 by means of the clutch cone 3 in motion, and the spindles 6 of the satellite systems describe a rotary movement around the spindle 4. Since, however, the wheels 7' mesh with the non-rotary wheel 10 of the sleeve a, the wheels of the satellite systems also turn around themselves and the wheel 9 thereof which meshes with the toothed wheel 5, causes the latter to revolve which being keyed to the spindle 4, sets the latter and consequently the wheels of the vehicle in motion. When it is desired to pass to the second speed the cone 3 is thrown out of engagement and the sleeve a is moved so as to disengage the wheel 10 from the wheel 7'. Thereupon the sleeve b is displaced to bring the wheel 44 in engagement with the wheels 7 and the cone 3 is again thrown into engagement, whereby the spindle 4 is caused to revolve in the same manner as before but with a greater speed. In order to pass to the third speed the cone 3 is thrown out of engagement and the sleeve b displaced until the wheel 45 engages with the wheels 9 of the satellite systems. Thereupon the cone 3 is returned, whereby the spindle 4 is set in motion the same way as before but with a still higher speed. In order to have the vehicle run with the same speed as that of the motor, the sleeve b is shifted inward to the full of its longitudinal movement, so as to act against the claw 5'', bringing the latter into engagement with the apertures 5' of the crown 5 connecting the latter with the support 6' of the spindles 6 of the satellite systems. In consequence thereof the spindle 4 is caused to revolve with the speed of the motor. This constitutes the direct engagement. Springs s automatically cause the disengagement of the claw 5'' from the apertures 5' as soon as, in order to discontinue direct engagement, the sleeve b is moved from left to right. The backward movement is effected, as will be seen, by bringing the wheel 10 of the sleeve a into engagement with the intermediary wheels 43 which mesh with the wheels 8 of the satellite systems.

Fig. 2 shows a modification of the above described apparatus, in which the wheels of the satellite systems are always in engagement with the wheels of the sleeves which in this case are loose and which, in order to produce the different speeds, can be rendered immovable as will be hereinafter described. The parts 1, 2 and 3 of the apparatus are the same as those of the one described and need not be again explained in detail. With the construction shown in this figure we can obtain two speeds, direct engagement for the forward movement and a reverse movement. Upon the spindles 6 the idle satellite wheels 12, 13, 15 and 16 are mounted, (in the present example four systems of such satellite wheels are shown, as seen from Fig. $2^a$) of which the wheel 13 constantly engages with the wheel 17 loosely mounted upon the shaft 4 and serving for the first speed, the wheel 12 constantly engages with the wheel 18 that is loosely mounted upon the shaft 4 and serving for the second speed and the wheel 15 constantly engages an intermediary toothed wheel 15' (as seen from Fig. $2^b$), the axles $15^2$ of which are supported in the same manner in the parts 2 of the fly wheel as the axle 6 of the satellite wheels, which mesh with the loose wheel 19 mounted on the shaft 4 and serving for the backward movement. The wheel 16 constantly engages with the wheel 20 which is rigid with the shaft 4 and which serves for the transmission of movement to the latter. The loose wheels 17 and 18 are centered by the wheels of the satellite systems distributed around them (Fig. $2^a$), while the wheel 19 is centered by the intermediate wheel 15' (Fig. $2^b$). Slidably mounted on the shaft 4 is a non-rotary sleeve a' which is formed with a projection 21 that serves as a key and is adapted to engage according to the position of the sleeve a' with any one of the wheels 18, 17 or 19. When the sleeve a' is shifted to the right, in the direction of the arrow x, to the full stroke of its movement it is caused to act by means of its projection 21 against the claw 25 capable of swinging upon the pivot 26 and causes the same to engage the notches 27 provided in the satellite wheels, and to thereby hold the latter stationary upon their spindles 6. Suppose that the motor revolves, that the cone 3 is disengaged and that the key 21 is in the position shown in Fig. 2. The shaft 4 is then at rest. In order to set it in motion with the first speed the sleeve a' will be shifted in the reverse direction of the arrow x, until the key 21 will engage the idle wheel 17 holding the latter stationary. Thereupon the parts 1 and 2 of the fly wheel are clutched by the cone 3, whereby the part 2 will be caused to revolve with the speed of the motor. The spindles 6 of the satellite wheels will be carried around the shaft 4, and as the wheels 13 of the satellite systems engage with the stationary wheel 17, the wheels of the satellite systems will revolve around their spindles 6. In consequence thereof the wheels 16 which mesh with the central wheel 20 keyed to the shaft 4 will transmit a rotary motion to the latter. In order to pass to the second speed the cone 3 is disengaged and the sleeve a' is shifted along the shaft 4, until its key 21 engages with the wheel 18. Thereupon the parts 1 and 2 of the fly wheel are coupled by the cone 3 which, as in the preceding example, will cause the transmission of movement to the shaft 4 with a different speed, the rotation of the satellite systems upon their spindles being now effected by the wheels 12, 16 and 20. To obtain backward movement the sleeve $a'$ is shifted to the left until its key 21 engages with the wheel 19 and holds the same stationary. As mentioned above this wheel 19 constantly engages with intermediary toothed wheels (not shown in the drawing) which mesh with the wheels 15 of the satellite system. Finally for the direct engagement, the sleeve $a'$ is shifted in the direction of the arrow $x$ until its key 21 strikes the claws 25, swinging the latter upon their pivots 26 and causing them to engage into the notches 27 of the satellite systems, whereby the latter become locked upon their spindles 6. In consequence thereof, when parts 1 and 2 are coupled by cone 3, the speed of the motor will be directly transmitted to the shaft 4 by the wheels 16 and the wheel 2 which is keyed to the shaft 4.

In Fig. 3 a second modification of the apparatus is shown. In principle this modification conforms with the construction shown in Figs. 1 and 2, and the function thereof is also the same as in the two preceding examples. The only difference here is that the spindles $6'$ of the satellite wheels are perpendicular to the driven shaft 4 instead of parallel thereto. This apparatus allows three speeds (forward movement). Mounted upon each spindle $6'$ of the satellite systems are three conical pinions, of which one 29 is keyed to the spindle $6'$ and constantly meshes with the central wheel 32 which is keyed to the shaft 4. The two other satellite wheels $29'$ and $29''$ are loose upon the spindle. The pinion $29'$ constantly meshes with the wheel 33 and the pinion $29''$ with the wheel $33'$, both of these wheels 33 and $33'$ being formed upon the same plate which is provided with a non-rotary sleeve $11'$ surrounding the driven shaft 4 and carrying projections 11. Slidably mounted upon each spindle $6'$ is a friction clutch 28 which can be brought to engage either with the wheel $29'$ or the wheel $29''$ and to accordingly lock the same to the spindle $6'$. The clutch is secured to the end of a rod 31, the other end of which engages a cam groove $31''$ provided in a block $31'$. The latter is formed on the end of a non-rotary sleeve $a''$ which is slidably mounted on the shaft 4. The displacement of the sleeve $a''$ can be effected by means of a forked lever (not shown), engaging the collar 49. When the sleeve $a''$ is shifted to the left sufficiently to cause by the cam groove $31''$ in the block $31'$ the movement of the clutch 28 until it engages with the wheel $29'$ locking the latter upon the spindle $6'$, in consequence thereof the rotary movement of the wheel $29'$ which is imparted thereto by the stationary wheel 33, when the parts 1 and 2 coupled by the cone 3 are revolving, will be transmitted to the spindle $6'$, from which by the fixed wheel 29 and wheel 32 rotary motion of a certain speed will be transmitted to shaft 4. When the sleeve $a''$ is shifted to the right the clutch 28 will be caused to engage with the wheel $29''$, in consequence of which a different speed will be transmitted to the shaft 4. For direct engagement the sleeve $a''$ will be shifted to the left until its block $31'$ will cause the spring actuated slidable claw 34, that normally engages notches 35 in the wheel 32, to enter notches 36 in the inner part 2 of the fly wheel. In consequence thereof the part 2 becomes directly coupled with the shaft 4 and transmits to the latter movement with the speed of the motor. This constitutes the direct engagement. By the shifting of the sleeve $a''$ to the left for the direct engagement the clutch 28 will also key the wheel $29'$ upon its spindle, but this has no effect on the direct transmission.

What I claim and desire to secure by Letters Patent is:—

1. In a transmitting mechanism, the combination with the motor shaft and the driven shaft, of a fly wheel composed of an exterior part fixed on the motor shaft and an inner part loose on the driven shaft, means for frictionally coupling the two parts, a system of loose satellite wheels in said inner part, a system of gears on the driven shaft, a gear fixed on the driven shaft and constantly meshing with one of the satellite wheels, the satellite wheels and the gears on the driven shaft being so proportioned as to allow different speeds, and means to render the loose satellite wheels effective.

2. In a transmitting mechanism, the combination with the motor shaft and the driven shaft, of a fly wheel composed of an exterior part fixed on the motor shaft and an inner part loose on the driven shaft, means for frictionally coupling the two parts, a system of loose satellite wheels in said inner part, a system of non-rotary gears on the driven shaft, a gear fixed on the driven shaft and constantly meshing with one of the satellite wheels, the satellite wheels and the non-rotary gears being so proportioned as to allow different speeds, and means to render the loose satellite wheels effective.

3. In a transmitting mechanism, the combination with the motor shaft and the driven shaft, of a fly wheel composed of an exterior part fixed on the motor shaft and an inner part loose on the driven shaft, clutch cones for frictionally coupling the two parts together, a system of loose satellite wheels in said inner part, a system of non-rotary gears on the driven shaft, a gear fixed on the driven shaft and constantly meshing with one of the satellite wheels, the satellite wheels and gears being so proportioned as to allow different speeds, and means to render the loose satellite wheels effective.

4. In a transmitting mechanism, the combination with the motor shaft and the driven shaft, of a fly wheel composed of an exterior part fixed on the motor shaft and an inner part loose on the driven shaft, means for frictionally coupling the two parts, a system of loose satellite wheels in said inner part, a system of non-rotary gears on the driven shaft, a gear fixed on the driven shaft and constantly meshing with one of the satellite wheels, the satellite wheels and the non-rotary gears being so proportioned as to allow different speeds, means to render the loose satellite wheels effective, and means for directly coupling the inner part of the fly wheel to the driven shaft for the direct engagement.

5. In a transmitting mechanism, the combination with the motor shaft and the driven shaft, of a fly wheel composed of an exterior part fixed on the motor shaft and an inner part loose on the driven shaft, clutch cones for frictionally coupling the two parts together, a system of loose satellite wheels, a system of non-rotary gears on the driven shaft, a gear fixed on the driven shaft and constantly meshing with one of the satellite wheels, the satellite wheels and non-rotary gears being so proportioned as to allow different speeds, means to render the loose satellite wheels effective, and means for directly coupling the inner part of the fly wheel with the driven shaft for the direct engagement.

6. In a transmitting mechanism, the combination with the motor shaft and the driven shaft, of a fly wheel composed of an exterior part fixed on the motor shaft and an inner part loose on the driven shaft, means for frictionally coupling the two parts, a system of loose satellite wheels in said inner part, a system of non-rotary gears on the driven shaft, a gear fixed on the driven shaft and constantly meshing with one of the satellite wheels, the satellite wheels and the non-rotary gears being so proportioned as to allow different changes of speed, means to render the loose satellite wheels effective, and a claw for directly coupling the inner part of the fly wheel with the driven shaft for direct engagement.

In testimony whereof I have signed this specification in the presence of two subscribing witnesses.

CHARLES EDOUARD HENRIOD.

Witnesses:
EMILE LEOTRET,
H. C. COXE.